Feb. 24, 1970 G. CERUTTI ET AL 3,497,136

BOX FOR A TAPE REEL OF A TAPE PUNCHING APPARATUS

Filed Sept. 18, 1967

INVENTORS
GIOVANNI CERUTTI
MASSIMO BORATTO

BY John Toggenburger
AGENT

United States Patent Office 3,497,136

Patented Feb. 24, 1970

3,497,136
BOX FOR A TAPE REEL OF A TAPE PUNCHING APPARATUS

Giovanni Cerutti and Massimo Boratto, Ivrea, Torino, Italy, assignors to Ing. C. Olivetti & C. S.p.A., Ivrea, Italy, a corporation of Italy Filed Sept. 18, 1967, Ser. No. 668,446
Claims priority, application Italy, Sept. 20, 1966, 21,858/66
Int. Cl. G06k *1/02*
U.S. Cl. 234—131 4 Claims

ABSTRACT OF THE DISCLOSURE

A box for a tape reel of a tape punnching apparatus comprising a conveyor for conveying the chads produced upon punching said tape outside said apparatus and a pivot pivotally mounting said reel characterized in that said box is joined with said apparatus by hooking means and is integral with a container located in correspondence with said conveyor to receive the chads. The core of the reel is mounted on a hub rotatable on the box and having a pair of yieldable arcuate elements normally contacting the internal surface of said core.

BACKGROUND OF THE INVENTION

This invention relates to a box for a tape reel of a tape punching apparatus comprising a conveyor for carrying the chads produced upon punching said tape outside said apparatus, said box carrying a pivot pivotally mounting said reel.

Normally in the known perforators, the tape reel is mounted on the perforator frame, whereas a container for the chads is joined to the perforator independently, whereby a relatively long time is required for changing the reel and to empty the container.

SUMMARY OF THE INVENTION

This and other disadvantages are obviated by the box according to the present invention, which is characterized in that said box is joined with said apparatus by hooking means, and is integral with a container located in correspondence with said conveyor to receive the chads so conveyed.

This and other characteristics of the invention will become apparent from the following description of a preferred embodiment thereof, and from the accompanying drawings, wherein:

DESCRIPTION OF THE PREFERRED EMBODIMENTS OF THE INVENTION

Figures 1, 2, 3:
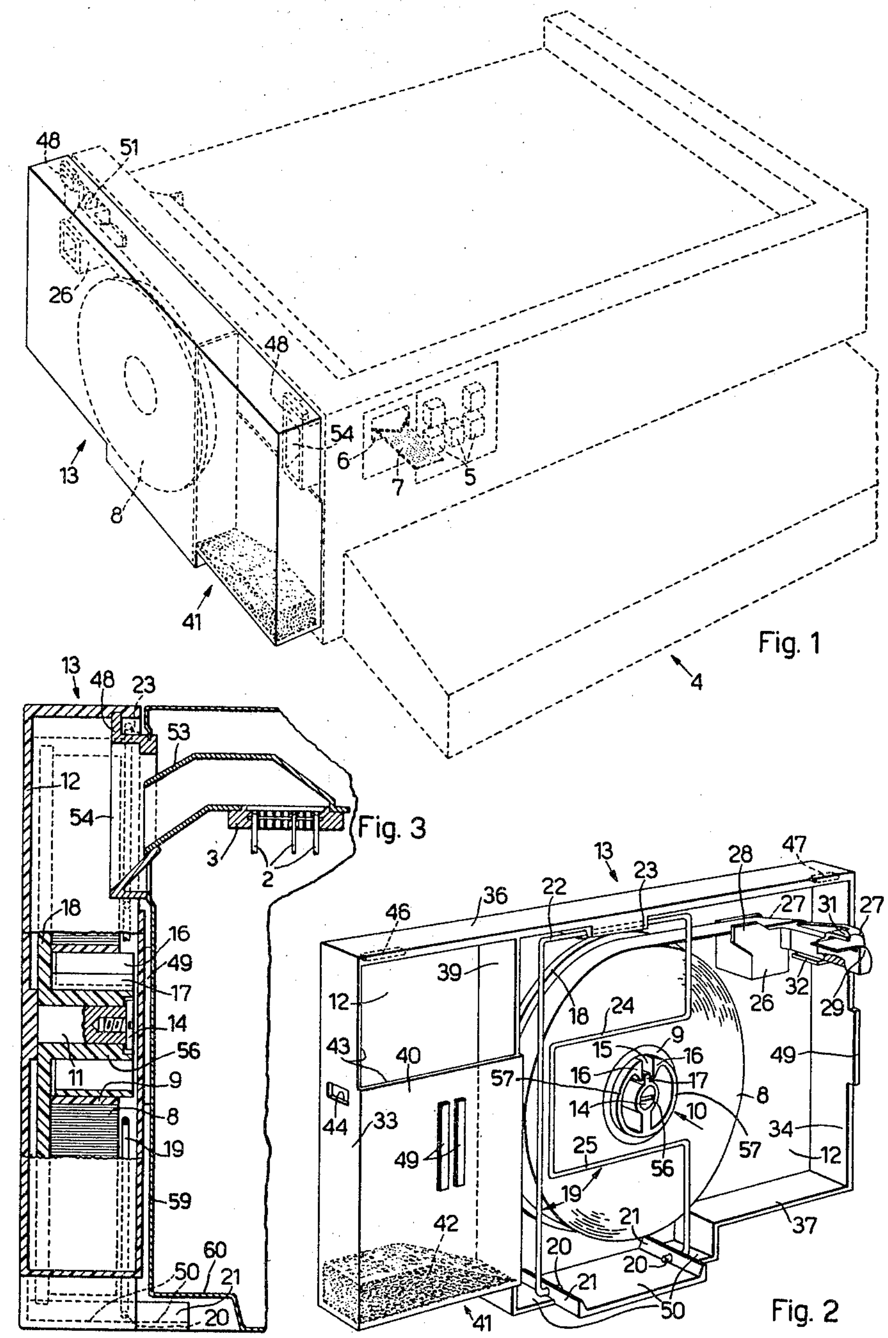
FIG. 1 is a left hand perspective view of a box for a tape reel according to the invention joined with a tape punching apparatus incorporated in a teleprinter.
FIG. 2 is a right hand perspective view of the box of FIG. 1.
FIG. 3 is a partial transverse sectional view of the box of FIG. 1.

With reference to the FIG. 1, the numeral 4 generically indicates a teleprinter having a cover 59 (FIG. 3) and incorporating a tape perforator including a set of punches 2, a punch die 3, a group of the control keys 5 (FIG. 1) and a slot 6 from which a punched tape 7 is fed out. The tape to be perforated forms a reel 8 (FIG. 2) wound around a cylindrical core 9 and is carried by a box, generically indicated by the numeral 13 and made with a transparent plastic material. The box 13 comprises also a forward vertical wall 33, a rear vertical wall 34, a top wall 36 and a bottom wall 37. This latter is provided with a depressed portion 50.

More particularly the core 9 is mounted on a hub, generically indicated in the numeral 10, and comprising a sleeve 56 (FIG. 3) rotatable on a pivot 11, which is secured to a lateral wall 12 of the box 13. The hub 10 (FIG. 2) comprises also a pair of arcuate yieldable arms 57 normally contacting the internal surface of the core 9. Each arm 57 is formed with an end projection 16, the two projections 16 forming a longitudinal gap 15 to allow the arm 57 to be inwardly flexed till the projections 16 contact a radial tooth 17. Normally the sleeve 56 is axially retained on the pivot 11 by a locking screw 14 (FIG. 3).

The reel 8 is retained on the hub 10 by a yieldable retaining member or clip 19 forcing the reel against a disk 18 integral with the hub 10. The clip 19 is formed of a suitably bent iron wire comprising three horizontal portions 22, 24 and 25, and a pair of bent ends 20 (FIG. 2) rotatable on a pair of holes provided on two corresponding projections 21 of the depressed portion 50. The horizontal portion 22 of the clip 19 is latched by a projection 23 provided on the top wall 36 of the box 13.

In order to insert a new reel 8 into the box the clip 19 may be tilted about the ends 20 by manually drawing each to other the horizontal portions 24 and 25 of the clip 19 so as to disengage the portion 22 from the projection 23. After having inserted the new reel 8, the clip 19 may be latched again on the projection 23 by drawing the portions 24 and 25 while forcing same toward the wall 12.

Secured to the box 13 is also a guide member 26 normally entering the cover 59 of the teleprinter 4 through an opening 51 (FIG. 1) and is provided with a pair of cylindrical surfaces 27 (FIG. 2) inclined 45 degrees with respect to the reel 8 for reversing 180 degrees the tape 7 coming out from the reel 8 and causing the tape 7 to be introduced in the die 2 (FIG. 3) from the rear side of the teleprinter 4. The member 26 is also provided with a pair of side lugs 28, 29 and with a pair of horizontal lugs 31 and 32 to further guide the tape 7. The tape 7 is fed forwards in FIG. 1 by a feeding device in a manner known per se. Therefore, the tape is thus unwound from the reel 8, which thus rotates clockwise in FIG. 2 and slides on the member 26.

Furthermore, integral with the box 13 is a container, generically indicated by the numeral 41, for collecting the chads 42. The container 41 is formed by an intermediate vertical wall 39, which separates the container 41 from a rear part of the box 13 housing the reel 8. The container 41 is partially closed by a wall 40 forming a window 43. The chads 42 dump into the container 41 upon being conveyed outside the teleprinter 4 by a conveyor 53 (FIG. 3) through another opening 54 provided on the cover 59. When the chads 42 overfill the container 41, they can overflow through a window 44 (FIG. 2) provided on the wall 33.

The top wall 36 of the box 13 is provided with a pair of inner depressions 46 and 47 adapted to engage a pair of hooking projections 48 (FIG. 1) provided on the left side of the cover 59. The box 13 is also provided with three projections 49 (FIG. 1) normally contacting the cover 59. The portion 50 of the wall 37 and the projections 21 thereof are extended at right of the edge of the wall 37 and are adapted to cooperate with a shoulder 60 (FIG. 3) provided on the bottom of the cover 59 to prevent the box 13 from being vertically displaced and from being disengaged from the projection 48.

It is intended that many modifications and improvements may be made to the described box without departing from the scope of the invention as defined by the appended claims.

What is claimed is:

1. A box for a tape reel of a tape punching apparatus comprising a conveyor for conveying the chads produced upon punching said tape outside said appartus, said box carrying a pivot pivotally mounting said reel, characterized in that said box is joined with said apparatus by hooking means, and is integral with a container located in correspondence with said conveyor to receive the chads so conveyed.

2. A box according to claim 1, wherein said reel comprises a core characterized by a hub rotatably mounted on said pivot and having a pair of yieldable arcuate elements normally contacting the internal surface of said core and adapted to be flexed inwards to replace the exhausted reel with a new reel.

3. A box according to claim 2, characterized in that said reel is also retained on said hub by a clip yieldable forcing same against a disk integral with said hub, said clip being removably latched on the box.

4. A box according to claim 1, wherein said punching apparatus is incorporated in a teleprinter having a cover, characterized in that said box is hooked on a side of said cover, and is provided with a guide member adapted to convey said tape to the rear side of the teleprinter upon being reversed 180 degrees, the punched tape being ejected from the front side of said cover.

References Cited

UNITED STATES PATENTS

| | | | |
|---|---|---|---|
| 3,175,443 | 3/1965 | Kettnich et al. | 234—131 X |
| 3,301,477 | 1/1967 | Edwards | 234—131 X |

FOREIGN PATENTS

| | | |
|---|---|---|
| 1,440,773 | 4/1966 | France. |

WILLIAM S. LAWSON, Primary Examiner

U.S. Cl. X.R.

83—165, 649